(12) United States Patent  
Maganas et al.

(10) Patent No.: US 6,264,908 B1
(45) Date of Patent: *Jul. 24, 2001

(54) METHODS AND SYSTEMS FOR THE CATALYTIC FORMATION OF SILICON NITRIDE USING A FLUIDIZED BED OF SILICA

(76) Inventors: Thomas C. Maganas, 1200 Ardmore, Manhattan Beach, CA (US) 90266; Alan L. Harrington, 425 Cirby Way #63, Roseville, CA (US) 95678

( * ) Notice: Subject to any disclaimer, the term of this patent is extended or adjusted under 35 U.S.C. 154(b) by 0 days.

This patent is subject to a terminal disclaimer.

(21) Appl. No.: 09/307,147

(22) Filed: May 7, 1999

Related U.S. Application Data

(63) Continuation-in-part of application No. 09/257,458, filed on Feb. 25, 1999, now abandoned, and a continuation-in-part of application No. 08/985,339, filed on Dec. 4, 1997, now Pat. No. 5,920,618.

(51) Int. Cl.[7] .................................................. C01B 21/068
(52) U.S. Cl. ............................................ 423/344; 588/205
(58) Field of Search ............................... 423/344, 212 C, 423/245.3, 247, 248, 215.5; 110/245, 254, 194; 588/205

(56) References Cited

U.S. PATENT DOCUMENTS

| | | | |
|---|---|---|---|
| 3,714,071 | 1/1973 | Michalko | 252/448 |
| 3,841,242 | 10/1974 | Sigg | 110/8 |
| 4,052,173 | 10/1977 | Schultz | 48/202 |

(List continued on next page.)

FOREIGN PATENT DOCUMENTS

| | | |
|---|---|---|
| 0176123 A1 | 4/1986 | (EP) . |
| 2687765 A1 | 2/1992 | (FR) . |
| 2701223 A1 | 8/1994 | (FR) . |
| 541962 | 12/1941 | (GB) . |
| 61-6103 * | 1/1986 | (JP) .................................... 423/344 |
| WO 93/24207 | 12/1993 | (JP) . |

OTHER PUBLICATIONS

Agarwal, Kedar, Pyrolysis of Polymer Waste, pp. 232–245, Society of Plastic Engineers, "Plastics Recycling: Technology Charts the Course," (Nov. 4, 1994).

(List continued on next page.)

Primary Examiner—Ngoc-Yen Nguyen
(74) Attorney, Agent, or Firm—Workman, Nydegger & Seeley

(57) ABSTRACT

Methods and systems for catalyzing the low temperature formation of silicon nitride. The methods and systems utilize catalytically reactive silica particles that are suspended by moving air within a reaction chamber and which are maintained at a temperature sufficient to cause the suspended silica particles to become catalytically reactive in the presence of carbon and nitrogen gas. Typically, the reaction chamber is maintained at a temperature in a range from about 150° C. to about 500° C. Moisture is generally provided by the organic matter, although additional moisture may be introduced into the reaction chamber in order to maintain reactivity of the silica particles. The silicon nitride is preferably deposited onto the surface of a metallic substrate, which might be located either within or externally to the reaction chamber. Depending on the ratio of oxygen to nitrogen provided within the reaction chamber, silicon nitride or a mixture of silicon nitride and silicon oxynitride will be produced.

19 Claims, 2 Drawing Sheets

U.S. PATENT DOCUMENTS

| | | | |
|---|---|---|---|
| 4,308,806 | 1/1982 | Uemura et al. | 110/244 |
| 4,497,637 | 2/1985 | Purdy et al. | 48/111 |
| 4,623,400 | 11/1986 | Japka et al. | 148/6.35 |
| 4,818,511 * | 4/1989 | Nishi et al. | 423/344 |
| 4,886,001 | 12/1989 | Chang et al. | 110/346 |
| 4,974,531 | 12/1990 | Korenberg | 110/245 |
| 4,977,840 | 12/1990 | Summers | 110/346 |
| 4,991,521 | 2/1991 | Green et al. | 110/347 |
| 5,010,830 | 4/1991 | Asuka et al. | 110/347 |
| 5,181,795 | 1/1993 | Circeo, Jr. et al. | 405/128 |
| 5,335,609 | 8/1994 | Nelson et al. | 110/346 |
| 5,347,936 | 9/1994 | Thorhuus | 110/245 |
| 5,370,854 * | 12/1994 | Henley et al. | 423/344 |
| 5,662,875 * | 9/1997 | Bachelard et al. | 423/344 |
| 5,676,070 | 10/1997 | Maganas et al. | 110/245 |
| 5,928,618 * | 7/1999 | Maganas et al. | 423/212 C |

OTHER PUBLICATIONS

Durham et al., Carbothermal Synthesis of Silicon Nitride: Effect of Reaction Conditions, 31–37,211,213–215,J. Am. Ceram. Soc., vol. 74 [1] (1991), No month.

Guedes De Carvalho et al., Mass Transfer Around Carbon Particles Burning In Fluidised Beds, 63–70, Trans. IChemE., vol. 69, Part A (1991), No month.

Homsy et al., Report Of A Symposium On Mechanics Of Fluidized Beds, 477–495, J. Fluid Mech., vol. 236 (1992), No Month.

Jean et al., Fluidization Behavior Of Polymeric Particles In Gas–Solid Fluidized Beds, 325–335, Chemical Engineering Science, vol. 47, No. 2 (1992), No month.

Kuipers et al., A Numerical Model Of Gas–Fluidized Beds, 1913–1924, Chemical Engineering Science, vol. 47, No. 8 (1992), No month.

Molerus, O., Heat Transfer In Gas Fluidized Beds. Part 1, 1–14, Powder Technology, 70 (1992), No month.

Shafey et al., Experimental Study On A Bench–Scale, Batch–Type Fluidized–Bed Combustor For Energy Production From Waste–Derived Fuels, 331–338, Energy, vol. 17, No. 4 (1992), No month.

Conversion Technology, Inc., Source Test Report: Fluid Bed Stripping For Particulates, Metals, POHCS, (1991), No month.

Seghers Engineering, Segers Zerofuel: A Concept For Autothermal Sludge Incineration (1992), No month.

\* cited by examiner

METHODS AND SYSTEMS FOR THE CATALYTIC FORMATION OF SILICON NITRIDE USING A FLUIDIZED BED OF SILICA

RELATED APPLICATIONS

This application is a continuation-in-part of U.S. application Ser. No. 08/985,339, filed Dec. 4, 1997, now issued U.S. Pat. No. 5,920,618, and a continuation-in-part of U.S. application Ser. No. 09/257,458, filed Feb. 25, 1999 now abandoned.

BACKGROUND OF THE INVENTION

1. Field of the Invention

The present invention is in the field of silicon nitride synthesis. More particularly the present invention is in the field of methods and systems for low temperature synthesis of silicon nitride from silica, carbon and nitrogen gas using a catalyzed carbothermal reaction.

2. Review of Relevant Technology

There has been an increasing interest in the production and use of silicon nitride ($Si_3N_4$) and related compounds, such as silicon oxynitride ($Si_2N_2O$). Silicon nitride is a highly chemically resistant material that can have a variety of uses. It can be used as a high temperature, chemically resistant ceramic material. It can also be used as a protective coating.

There are a variety of different ways to manufacture silicon nitride. One method disclosed in U.S. Pat. No. 4,387,079 to Kasai et al. involves heat treating a nitrogen-containing silane, such as tetra-amide-monosilane or silicon imide, with ammonia at a temperature above 400° C. for a period of at least two hours to obtain silicon nitride. Preliminary, the nitrogen-containing silane is prepared by continuously reacting gaseous silicon tetra-chloride with gaseous ammonia at a temperature of −30° C. to 70° C. However, the drawback of the Kasai et al. process is that the reagents and methods disclosed therein are expensive and involve materials which can be harmful if handled improperly.

Another synthetic route for making silicon nitride is disclosed in U.S. Pat. No. 4,859,443 to Marosi. In Marosi, silicon nitride powders are prepared in a gas-phase reaction by reacting silicon tetrachloride with ammonia at above 500° C. in a fluidized bed of silicon nitride particles. This method requires the use of a fluidized bed of silicon nitride and only results in the formation of silicon nitride deposits on the pre-existing silicon nitride particles within the fluidized bed.

U.S. Pat. No. 5,662,875 to Bachelard et al. discloses a process in which silica, carbon and a seed crystal of silicon nitride are reacted, in a nitrogen countercurrent, in the presence of a volatile metal selected from the group consisting of beryllium, magnesium, calcium, strontium, germanium, tin, titanium, hafnium, sodium, and barium in a reaction zone possessing a temperature gradient. The Bachelard et al. reaction requires specialized heating zones as well as elevated temperatures of up to 1500° C.

Others have disclosed a carbothermal reaction between silica ($SiO_2$) and carbon in the presence of pure nitrogen ($N_2$) gas in an attempt to reduce the cost of producing silicon nitride as well as increasing its quality. Such attempts are reported in Durham et al., "Carbothermal Synthesis of Silicon Nitride: Effective Reaction Conditions," *J. Am. Ceram. Soc.,* Vol. 74 (1), pp. 31–37 (1991). Durham et al. report that oxygen must carefully be removed from the reaction chamber, an excess of carbon relative to silica must be employed, and formation of silicon nitride only occurs within a very narrow temperature range of about 1350° C. to 1550° C.

A variety of other synthetic routes to silicon nitride are disclosed in U.S. Pat. Nos. 4,935,214 to Puger et al.; 5,232,677 to Fukuoku et al.; 5,258,169 to Wannagat et al; and 5,332,697 to Smith et al.

In view of the foregoing, it would be a significant advancement in the art to provide methods and systems for the synthesis of silicon nitride that avoided the use of dangerous and expensive chemical precursors.

It would be a her advancement in the art to provide methods and systems for manufacturing silicon nitride that could be carried out without dangerous and expensive chemicals while operating at a temperature far lower than presently required using conventional carbothermal methods.

It would be an additional advancement in the art if such methods and systems for low temperature synthesis of silicon nitride were able to employ catalytic means in order to carry out a modified carbothermal reaction sequence for silicon nitride at lower temperatures.

It would be a considerable advancement in the art to provide methods and systems for manufacturing silicon nitride that could utilize commonly found materials which were inexpensive or even considered to be waste products.

Such methods and systems for manufacturing silicon nitride are disclosed and claimed herein.

SUMMARY AND OBJECTS OF THE INVENTION

The present invention relates to improved methods and systems for manufacturing silicon nitride using fluidized bed technology. More particularly, the present invention employs fluidized beds that utilize silica sand and other forms of silica as the fluidizable particulate media. When finally divided carbon, such as soot produced by diesel engines, industrial burners, or by burning other carbon-containing fuels is introduced into a fluidized bed of silica, silicon nitride ($Si_3N_4$), silicon oxynitride ($Si_2N_2O$), or mixtures thereof are formed, typically on the surface of a metallic substrate In addition, virtually any inexpensive or waste carbonaceous material can be introduced into a fluidized bed in order to yield silicon nitride so long as the proper conditions are maintained.

The formation of silicon nitride, silicon oxynitride, or combinations thereof has been observed at temperatures as low as 150° C. In general, increasing the temperature above about 200° C. increases the rate of formation of silicon nitride and silicon oxynitride. Because others have reported that carbothermal production of silicon nitride by directly reacting carbon and silica in the presence of nitrogen gas only yield silicon nitride at temperatures exceeding 1350° C., and because the systems and methods of the present invention yield silicon nitride at much lower temperatures, it is believed that some form of catalysis is occurring which reduces the energy barriers inherent in forming silicon nitride using conventional carbothermal methods.

In general terms, the manufacture of silicon nitride and/or silicon oxynitride using the methods and systems disclosed herein requires the following: particulate silica, such as silica sand or silica gel, a source of carbon, nitrogen gas and the proper conditions necessary to generate catalytic conditions in which carbon is catalytically oxidized in the presence of silica to form carbon dioxide. Under such conditions a byproduct of the catalytic oxidation of carbon to carbon dioxide is silicon nitride and/or silicon oxynitride, depending on the conditions. In most cases silicon nitride and silicon oxynitride have been observed in the form of a film deposited on metallic substrates, such as stainless steel conduits normally associated with the venting of exhaust gases generated in a fluidized bed as well as screws, tools and other metallic substrates placed directly within the fluidized bed of silica particles. Thus, although the reaction mechanism is not entirely understood it appears that nitrogen normally found within air reacts in the presence of carbon and catalytically reactive silica to form silicon nitride and silicon oxynitride, which preferably form as a deposited film on the surface of metallic substrates.

The preferred temperature for forming silicon nitride and silicon oxynitride using the systems and methods disclosed herein is in a range from about 150° C. to about 500° C., more preferably in a range from about 200° C. to about 450° C., and most preferably in a range from about 250° C. to about 375° C. Nevertheless, it would appear that the formation of silicon nitride at any temperature below about 1000° C. using a fluidized bed of silica particles, carbon and nitrogen gas would appear to involve some kind of catalysis and is within the scope of the invention.

Although it is not entirely understood, it is believed that when silica is heated to a temperature in a range from about 150° C. to about 500° C. that there is considerable surface chemistry involving the release and reformation of hydroxyl groups with intermediate strained rings of silicon and oxygen being formed which quickly hydrolyze back to hydroxyl groups in the presence of moisture. It is believed that in the presence of a catalytic reaction between silicic acid groups found on the surfaces of silica particles and carbon to yield carbon dioxide that nitrogen gas and silica concomitantly react to yield silicon nitride and silicon oxynitride.

Where no attempt is made to eliminate oxygen normally found in the air or in waste exhaust streams, silicon oxynitride, or a mixture of silicon oxynitride and silicon nitride are produced. Eliminating, or at least reducing, the amount of oxygen tends to push the equilibrium towards the formation of silicon nitride rather than silicon oxynitride. At least a portion of the oxygen found in silica and in air can apparently be consumed by means of carbon being catalytically converted into carbon dioxide.

In short, it is an object of the invention to provide methods and systems for the synthesis of silicon nitride (and silicon oxynitride) that avoid the use of dangerous and expensive chemical precursors.

It is a further object and feature of the present invention to provide methods and systems for manufacturing silicon nitride (and silicon oxynitride) that can be carried out without dangerous and expensive chemicals while operating at temperature far lower than presently required using conventional carbothermal methods.

It is an additional object of the invention to provide methods and systems for low temperature synthesis of silicon nitride (and silicon oxynitride) that are able to employ catalytic means in order to carry out a modified carbothermal reaction sequence for silicon nitride and silicon oxynitride at lower temperatures.

It is another object of the invention to provide methods and systems for manufacturing silicon nitride and silicon oxynitride that can utilize commonly found materials which are inexpensive or which may even be considered to be waste products.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity in detail to the use of the accompanying drawings in which.

DETAILED DESCRIPTION OF THE PREFERRED EMBODIMENTS

Figure 1:
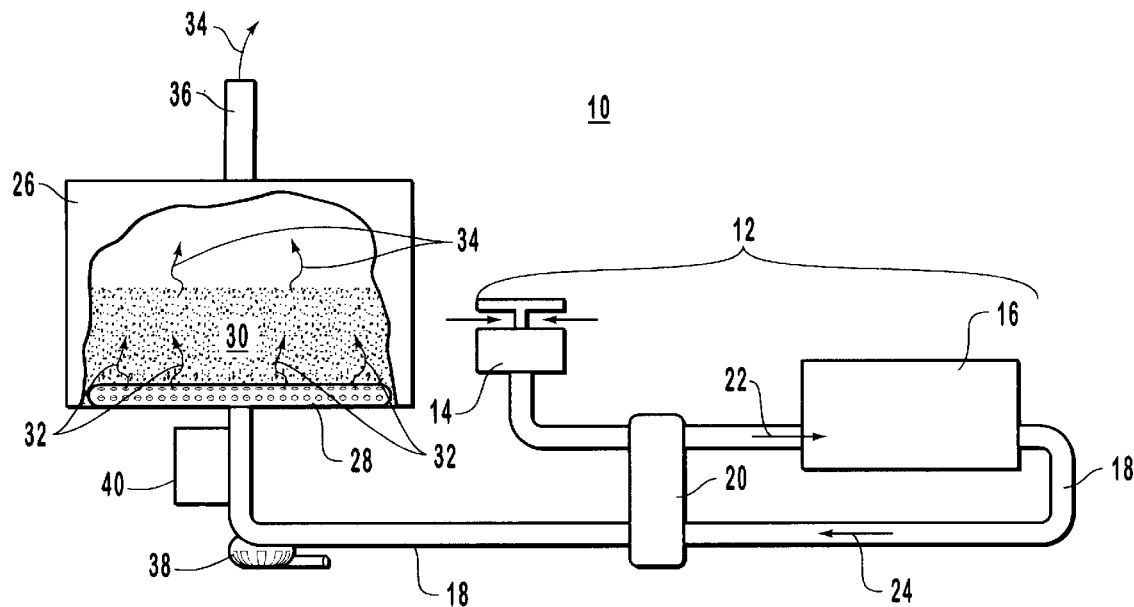
FIG. 1 is a cross-section view of a reaction chamber used in combination with a diesel engine for oxidizing incomplete combustion products and concomitantly forming silicon nitride.

The present invention relates to methods and systems that utilize a fluidized bed of silica in order to catalytically form silicon nitride and/or silicon oxynitride. Such methods and systems are in principle a variation of conventional carbothermal processes known in the art for forming silicon nitride. The critical difference is that the present invention allows for the formation of silicon nitride at temperatures far less than those employed using conventional carbothermal methods. Because the inventive processes and systems yield silicon nitride at temperatures that are considerably lower than those required using conventional carbothermal processes, such process and systems are considered to involve some form of catalysis not withstanding the fact that some silica is consumed during formation of silicon nitride and/or silicon oxynitride.

Contrary to the conventional belief that silica used in fluidized beds is completely inert, the inventors previously found that fluidized beds of silica and alumina can be used to catalytically oxidize carbonaceous wastes such as medical wastes, corpses, garbage and municipal sludge. Processes and systems utilize fluidized beds of silica and/or alumina for use in catalytically oxidizing such materials are disclosed and claimed in U.S. Pat. No. 5,676,070. Thereafter, it was discovered that fluidized beds of silica and alumina could also be used in the catalytic degradation of incomplete combustion products produced by the burning of carbon-containing fuels, particularly fossil fuels, within internal combustion engines, industrial burners and the like. Methods and systems used in catalytically oxidizing incomplete combustion products of carbon-containing fuels are disclosed in the following copending U.S. applications: Ser. No. 08/985,339, filed Dec. 4, 1997; Ser. No. 09/257,458, filed Feb. 25, 1999; and Ser. No. 09/307/145, filed May 7, 1999, in the names of Thomas C. Magana and Alan L. Harrington and entitled "Apparatus for Low Temperature Degradation of Diesel Exhaust and Other Incomplete Combustion Products of Carbon-Containing Fuels." For purposes of disclosing methods and systems utilizing fluidized beds of silica in order to catalytically oxidize a wide variety of carbonaceous materials, while concomitantly forming silicon nitride, the foregoing patent and applications are incorporated herein by specific reference.

In the course of testing fluidized beds of silica to determine all the different types of carbonaceous wastes that may be catalytically oxidized thereby, it was discovered that a thin but continuous layer of a smooth, brownish-red, transparent substance was depositing out onto the interior surface of the exhaust channel used to vent treated gases being emitted from the fluidized beds. In addition, bolts, tools and other metallic substances placed within the fluidized bed itself also were coated with the same smooth, brownish-red, transparent substance. Upon further inspection it was determined that this substance was either silicon nitride or a mixture of silicon nitride and silicon oxynitride.

What was most startling was that literature relating to carbothermal synthesis of silicon nitride, such as the aforementioned Durham et al. article and Bachelard et al. patent, teach that silicon nitride can only be produced at very high temperatures (~1500° C.). In contrast, the fluidized beds of silica used in the present invention were only operating at temperatures between 150–500° C. According to the thermodynamic conditions required by conventional carbothermal synthesis, it was previously believed to be impossible for silicon nitride to form at such low temperatures. Nevertheless, the fact that silicon nitride and/or silicon oxynitride were formed at such low temperatures indicates that silicon nitride was being formed in a carbothermal-like synthetic route but with some sort of catalytic reaction assisting the formation of silicon nitride. Evidently the same mechanism responsible for catalytically oxidizing carbonaceous materials to carbon dioxide and water appear to be responsible for the concomitant side reaction of forming silicon nitride from silica and gaseous nitrogen found in air.

Virtually any carbonaceous material can be used as a carbon source in order to yield silicon nitride using the methods and systems disclosed herein. These include, for example, carbon containing fuels such as coal, coke, petroleum, natural gas, and derivatives of the foregoing. Such materials provide a very concentrated form of carbon which would then be available to yield silicon nitride according to the following possible reactions believed to occur in conventional carbothermal synthetic routes:

$$3SiO_2(s)+6C(s)+2N_2(g)\rightarrow Si_3N_4(s)+6CO(g) \quad (1)$$

$$SiO_2(s)+C(s)\rightarrow SiO(g)+CO(g) \quad (2)$$

$$3SiO(g)+3C(s)+2N_2(g)\rightarrow Si_3N_4(s)+3CO(g) \quad (3a)$$

$$3SiO_2(s)+CO(g)\rightarrow SiO(g)+CO_2(g) \quad (3b)$$

$$3SiO(g)+6CO(g)+2N_2(g)\rightarrow Si_3N_4(s)+3CO_2(g) \quad (4)$$

Another source of carbon that may be used in the synthesis of silicon nitride and silicon oxynitride includes any waste carbonaceous product, such as municipal garbage, sewer sludge, medical waste, animal corpses, and the like, each of which can be catalytically oxidized to carbon dioxide, water and ash using the methods and systems disclosed herein but which can also yield silicon nitride as a byproduct.

Another extremely inexpensive source of waste carbon may be found in the incomplete combustion products of carbon containing fuels. The latter are especially preferred since they include finely divided carbon particles in the form of soot, as well as unburnt hydrocarbon gases, both of which readily react with, and are oxidized by, silica. Of course, ground carbon particles such as ground coal, charcoal, coke, and the like could also be used as the source of carbon for catalytically forming silicon nitride and/or silicon oxynitride using the inventive methods and systems disclosed herein. Even ground wood, sawdust, ground paper, ground plastics, and the like could be used as a source of carbon.

The term "incomplete combustion products", as used in the specification and the appended claims, shall refer to incompletely oxidized reaction products that are formed during combustion or other rapid or incomplete oxidation processes involving carbon-containing fuels. The incomplete combustion products may consist of, for example, gases, solid particulates, liquids, or mixtures thereof. Incomplete combustion products typically include carbon soot, unburnt hydrocarbons, whether in particulate or in vaporous form, carbon monoxide, hydrogen gas, and the like. The term "carbon soot" is a subset of the term "incomplete combustion products" and includes unburnt and residual carbonaceous and hydrocarbon particulates.

The term "carbon-containing fuel" shall be understood to refer to any organic material that may be combusted or burned in order to generate or release energy, usually in the form of heat, light or a combination thereof The term "fossil fuel" is a subset of "carbon-containing fuel" and includes coal, oil, natural gas, derivatives of coal, natural gas and oil, and the like. Examples of usefull carbon-containing fuels other than typical fossil fuels such as gasoline, diesel fuel and coal include paraffins, such as methane, ethane, propane and the like; cyclo-paraffins, such as cyclopropane, cyclohexane and the like; olefins, such as ethylene, propylene, butylene and the like; cyclo-olefins, such as cyclopentene, cyclobutene and the like; diolefins, such as butadiene, pentadiene, allenes and the like; and alkynes, such as acetylene, allylene and the like.

Reference is now made to illustrated in FIG. 1, which illustrates a first embodiment of a catalytic system 10 adapted for use in treating the incomplete combustion products produced by an internal combustion engine, which has also been found to yield silicon nitride as a byproduct. The internal combustion engine may be a diesel engine 12, or may alternatively be other internal combustion engines or other devices that bum fossil fuels. Catalytic system 10 functions to more fully oxidize the incomplete combustion products of an internal combustion engine in a fashion similar to conventional catalytic converters but without the need for expensive metallic catalysts, such as palladium, platinum and the like.

A typical diesel engine 12 comprises an air intake 14, a combustion chamber 16, and an exhaust channel 18. A turbocharger 20 is configured to compress an intake air/fuel mixture 22 that is fed into the combustion chamber 16 in order to increase the efficiency of the diesel engine 12 by supplying more combustion air initially. The turbocharger is often configured to communicate with the exhaust channel 18, with the flow of exhaust gases providing force for driving the turbocharger.

Waste exhaust products 24 are discharged from the combustion chamber 16 into the exhaust channel 18. In FIG. 1, the exhaust channel 18 is depicted as providing an uninterrupted conduit that directs the waste exhaust products 24 into a reaction chamber 26. However, any appropriate means for introducing the waste exhaust products 24 into the reaction chamber 26 may be employed. The majority of waste exhaust products 24 typically consist of inert nitrogen gas, carbon dioxide, water, and some oxygen gas. However, due to non-ideal air/fuel ratios, incomplete mixing, inefficiencies inherent during acceleration, or other reasons, some of the diesel fuel used in diesel engine 12 may not be completely burned into $CO_2$ and water. As a result, incomplete combustion products, most notably carbon soot, unburnt particulate and gaseous hydrocarbons, and carbon monoxide are produced in significant quantities by the diesel engine 12. Such incomplete combustion products are often visible, particularly during the acceleration phase of a diesel powered vehicle when combustion is least efficient.

The waste exhaust products 24 are introduced into the reaction chamber 26 by means of one or more diffusion pipes 28. The diffusion pipe 28 includes a plurality of holes or passages distributed therethrough which allows for a desired distribution pattern of the waste exhaust products 24 throughout the reaction chamber 26. The waste exhaust products 24 are more particularly diffused throughout catalytically reactive particles 30 located within the reaction chamber 26 as diffused exhaust gases 32. The catalytically reactive particles 30 consist essentially of silica particles. The term "consist essentially of" should be understood to mean that the catalytically reactive particles mainly consist of silica, but they may include minor quantities of impurities such as metals and ash typically found in silica. Moreover, whereas the silica is itself catalytically reactive such that expensive catalysts such as palladium and platinum are unnecessary, inclusion of such materials in minor amounts in order that the silica still performs the majority of catalytic activity would be within the scope of the present invention.

In a preferred embodiment the catalytically reactive silica particles 30 are "fluidized," as that term is understood in the art, meaning that at least a portion of the particles are elevated by rising gases such that they are not in a state of natural particle packing density. Fluidizing or elevating the particles leaves them in a much less compacted state. This fluidized or elevated state yields particles having a surface area that is more accessible and available for contact with the diffused exhaust gases 32 rising through the particles 30. Increased surface contact with the diffused exhaust gases 32 increases the catalytic activity of the reactive particles 30 vis-a-vis the diffused exhaust gases 32. As the diffused exhaust gases 32 rise through the catalytically reactive particles 30 they are catalytically oxidized into reaction products having a higher oxidation state, such as carbon dioxide, water and some ash. As they rise through, and are catalytically oxidized by, the catalytically reactive, particles the diffused exhaust gases 32 become treated exhaust gases 34. The treated exhaust gases 34 exit the reaction chamber 26 by means of an outlet or stack 36. Silicon nitride is also formed and has been observed in the form of a thin coating on the interior surface of the outlet or stack 36.

As stated above, it is preferable for the catalytically reactive particles 30 to be in a fluidized or suspended state in order to increase their available surface area and ability to catalytically react with the diffused exhaust gases 32. In some cases, the waste exhaust products 24 themselves will have sufficient pressure to cause the catalytically reactive particles 30 to become fluidized or otherwise partially suspended. However, in the case where the waste exhaust products 24 have insufficient pressure to cause adequate fluidization or levitation of the catalytically reactive particles 30, it may be necessary, or at least preferable, to increase the pressure of the waste exhaust products 24 prior to their being introduced into the reaction chamber 26. This may be done by means of a compressor 38 or other compressing means known in the art In many cases the pressure of the waste exhaust products 24 will depend on the rate at which the diesel engine is consuming diesel fuel and will typically correspond to the number of RPMs at which the engine is running. At higher RPMs the exhaust gases will typically have adequate pressure to cause at least partial fluidization of the catalytically reactive particles 30. However, at lower RPMs the waste exhaust products 24 may require assistance by means of the aforementioned compressor 38.

An information feed-back mechanism (not shown) may be utilized to determine whether or not the compressor 38 needs to be activated at any particular point in time as well as the degree of pressurization to be imparted to the waste exhaust products 24. One of ordinary skill in the art will be able to adjust the amount of compression imparted by the compressor 38 depending on the requirements of the overall catalytic system 10.

It is preferable for the reaction chamber 26 to be maintained at a temperature in a range from about 150° C. to about 500° C., more preferably in a range from about 200° C. to about 450° C., and most preferably in a range from about 250° C. to about 375° C. Such temperatures are preferred in view of their being generally within the temperature range of waste exhaust gases generated by internal combustion engines after passing through the exhaust system. Although such temperatures are preferred, the catalytic oxidation of soot, hydrocarbons and other incomplete combustion products of carbon-containing fuels while concomitantly forming silicon nitride at any temperature by means of silica particles is within the scope of the invention. In general, temperatures below about 1000° C. would seem to be well within the range whereby silicon nitride is formed catalytically since conventional carbothermal processes require temperatures of about 1500° C. to yield silicon nitride.

Waste exhaust products 24 typically leave the diesel engine 12 at temperatures of about 400° C. to about 550° C. However, the waste exhaust products 24 typically begin to cool after leaving the diesel engine 12 and after passing through the exhaust channel 18. In order to preserve as much of the heat generated by the diesel engine 12 as possible it is preferable to position the reaction chamber 26 in relation to the diesel engine 12 so that the waste exhaust products 24 do not cool to temperatures below the preferred operating temperature of the catalytic system 10. In addition, various insulating means known in the art may be utilized in order to preserve a desired amount of the heat produced by burning fuel within the diesel engine 12 and found within the waste exhaust products 24 as they leave combustion chamber 16.

In the event that it is desired to provide auxiliary inputs such as increased heat, moisture, nitrogen gas, fuels, or other desired inputs along with the waste exhaust products 24, auxiliary input provider 40 may be employed. In this way, any desired auxiliary input can be mixed with the waste exhaust products 24 prior to their entering into the reaction chamber 26. Nevertheless, the waste exhaust products 24 will themselves generally provide adequate moisture in the form of combustion water produced by the oxidation of hydrocarbons, as well as nitrogen normally found in the air.

In alternative embodiments, the fluidization of the catalytically reactive particles 30 may be carried out by means of auxiliary air jets or the like (see FIG. 3) which act independently of the force of the waste exhaust products 24 being introduced into the reaction chamber 26 through the diffusion pipe(s) 28. In addition, auxiliary heating means (see FIG. 3) located within the reaction chamber 26 may be used in order to maintain the reaction chamber 26 at a desired temperature, particularly at start up when the diesel engine is cold and the waste exhaust products 24 are too low to maintain the reaction chamber 26 at the desired temperature. Finally, in the event that the waste exhaust gases are too hot such that their temperature is higher than the desired operating temperature of the reaction chamber 26, it may be necessary to provide cooling means (not shown) in order to maintain the waste exhaust products 24 at a desired temperature.

It is also advantageous to select catalytically reactive silica particles 28 that have a relatively high specific surface area. It is believed that it is at the surface of the reactive particles 28 where the reactive hydroxyl radicals are generated. Accordingly, increasing the surface area of the particles 28 without increasing their weight allows for the use of a lower mass of reactive particles 28 while maintaining a desired level of reactivity of the catalytic system 10. The amount of silica particles that are needed may be significantly reduced when the grain size is reduced and/or the surface of the particles is made to be more irregular, both of which tend to increase the specific surface area of the particles.

The catalytically reactive particles 28 facilitate the oxidation of the incomplete combustion products found in the waste exhaust products 24. In particular, at least carbon soot and unburnt hydrocarbons and other organic gases are converted into carbon dioxide and water, while other incomplete combustion products may be converted into more fully oxidized counterparts. Even carbon monoxide found in diesel exhaust has been shown to be greatly reduced when diesel exhaust is passed through fluidized silica particles.

Figure 2:
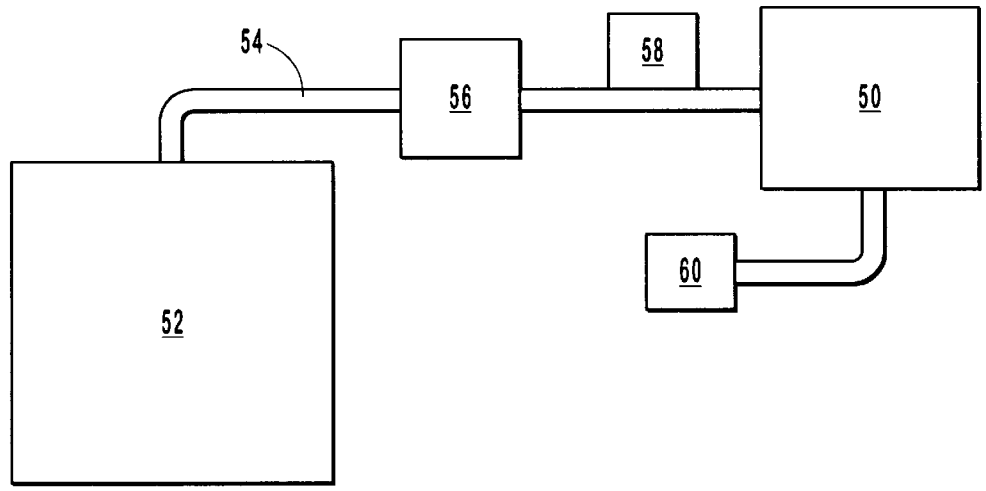
FIG. 2 is a schematic view of a reaction chamber used in combination with an exhaust flue of an industrial burner.

The catalytic systems according to the present invention can be modified, such as by upscaling or downscaling, to catalytically oxidize virtually any waste exhaust streams that include incomplete combustion products of carbon-containing fuels. For example, FIG. 2 is a schematic diagram depicting a reaction chamber 50 upsized and configured for use in catalytically oxidizing incomplete combustion products produced by an industrial burner 52. Such industrial burners 52 commonly burn coal, coke, fuel oil, natural gas, or derivatives of coal, petroleum or natural gas, all of which are capable of generating incomplete combustion products such as soot, unburnt or partially burnt hydrocarbons, and carbon monoxide. Industrial burners 52 are utilized in a wide range of industrial operations, such a power generation, metal smelting, manufactuing, and the like.

Exhaust gases produced by the industrial burner 52 are carried from the burner 52 to the reaction chamber 50 by means of an exhaust conduit or channel 54. A compressor 56 may be used to ensure that the exhaust gases produced by the industrial burner 52 are fed into reaction chamber 50 with adequate pressure. An inline introducer of auxiliary inputs 58 may be used in order to ensure adequate heat and/or moisture content of the exhaust gases before they are introduced into the reaction chamber 50. In addition, or alternatively, beat and/or moisture may be introduced by means of an offline or parallel introducer of auxiliary inputs 60 connected separately to the reaction chamber 50. Introducer 60 may also be used to independently fluidize or at least partially suspend the catalytically reactive particles of silica or alumina located within the reaction chamber 50. Thus, silicon nitride can be produced as a beneficial byproduct during the catalytic oxidation of unburnt or partially burnt carbonaceous emissions.

Both the inline introducer of auxiliary inputs 58 and the offline introducer of auxiliary inputs 60 can be used to input additional moisture than that provided by the carbon source, nitrogen in concentrations greater than that found in the air, and other gaseous or solid inputs as desired. Thus, the inline and offline introducers 58 and 60 schematically depict means for introducing any auxiliary input as desired. In addition, it should be understood that the embodiments depicted in FIGS. 1 and 3 can be modified using any means known in the art for providing auxiliary inputs as desired.

Figure 3:
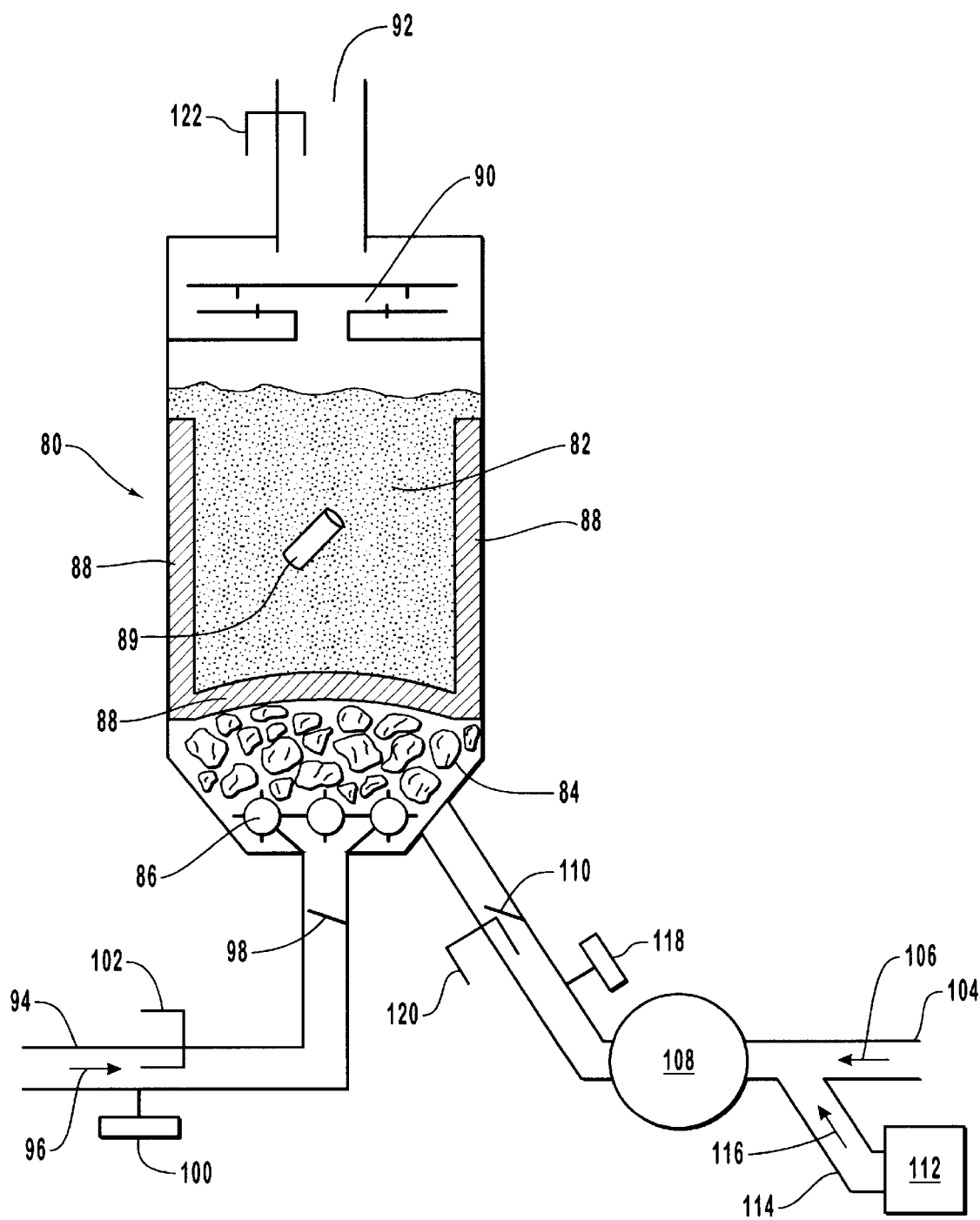
FIG. 3 is a cross-section view of an alternative embodiment of a reactive chamber according to the invention.

In order to illustrate another preferred embodiment of a catalytic system according to the present invention, reference is now made to FIG. 3. Depicted therein is a reaction chamber 80 that includes therein catalytically reactive particles 82 comprising silica. The bed of catalytically reactive silica particles 82 sits atop a bed of rocks 84 surrounding porous introduction tubes 86 in order to more evenly distribute waste exhaust gases emitted by the porous tubes 86 and into the catalytically reactive particles 82. An auxiliary heating element 88 that provides resistive heat is disposed around the inner circumference of the reaction chamber 80 in order to provide additional heat if needed during operation of the reaction chamber 80. A metallic substrate 89 is submerged within the bed of catalytically reactive particles 82, which provides a surface upon which silicon nitride and/or silicon oxynitride can be formed. Exhaust gases that have been treated by reaction chamber 80 are removed from the reaction chamber 80 by means of a cyclone filter 90 that directs the treated exhaust gases out an exhaust stack 92.

Exhaust gases 96 are introduced into the reaction chamber 80 by means of an exhaust channel 94 communicating between reaction chamber 80 and an internal combustion engine (not shown), such as a diesel engine or some other source of waste gases, such as an industrial burner. The exhaust channel 94 may further be equipped with an anti-backflow trap 98 in order to ensure essentially one-way flow of exhaust gases 96 into the reaction chamber 80. The exhaust channel 94 may optionally be equipped with a pressure tube 100 for measuring the pressure of the exhaust gases 96. A Pitot tube 102 may also be employed to measure the velocity of the exhaust gases 96.

In order to assist the exhaust gases 96 in heating, and/or fluidizing the catalytically reactive particles 82 within the reaction chamber 80, an auxiliary air input system may be employed. Such an auxiliary input system preferably includes an air input channel 104 through which air 106 can be introduced into the reaction chamber 80. The air is compressed and accelerated by means of an air turbine 108. An anti-backflow trap 110 may be used to ensure one-way flow of air 106 into the reaction chamber 80 and in order to prevent unwanted escape of exhaust gases 96 through the air input channel 104.

A heating unit 112 may also be employed for introducing heated air into air input channel 104. Heating unit 112 may also provide other auxiliary inputs such as increased moisture and/or nitrogen. A heated air channel 114 communicating between the heating unit 112 and air input channel 104 directs heated air 116 into air channel 104. An optional pressure tube 118 may be used to measure pressure, while an auxiliary Pitot tube 120 may be used to measure the velocity, of the air 106 being input into the reaction chamber 80. Finally, a Pitot tube 122 may be used within the exhaust stack 92 in order to measure the velocity of the treated exhaust gases exiting the exhaust stack 92.

Whereas the foregoing apparatus were designed to treat waste exhaust gases produced by the burning of carbon-containing fuels, such apparatus and systems may be modified to accommodate the introduction of a wide variety of carbonaceous materials, such as the aforementioned wastes, such as garbage, or fuels, such as fossil fuels. Such carbonaceous materials may be introduced in the form of a gas, particulate solid, liquid, or solid mass in order to provide a source of carbon for the catalytic generation of silicon nitride.

Several examples of embodiments of the invention are presented in order to demonstrate the practicability and usefulness the invention.

EXAMPLE 1

Silica particles were suspended within a reaction chamber that was maintained at a temperature of 420–425° C. A piglet corpse weighing about 35–40 lbs. was placed into the reaction chamber and submerged within the fluidized silica sand. After 45 minutes, the reaction chamber was opened up and inspected. Nothing remained of the piglet corpse: there were no bones, no teeth, no tissues that could be detected, which proved that the media particles under the above-stated conditions became highly reactive and were able to completely oxidize the entire piglet corpse. That the silica sand was catalytically reactive rather than inert was demonstrated by the fact that the reaction chamber was kept at a temperature far below the temperature required for a corpse to combust.

The foregoing process is repeated after introducing a metallic substrate into the fluidized bed of silica. Silicon nitride and/or silicon oxynitride are formed on the surface of the metallic substrate.

EXAMPLE 2

Waste tissues and other organic materials were placed within a reaction chamber on a regular and ongoing basis. The reaction chamber was operated according to the methods disclosed herein and maintained at a temperature of 300–375° C. It was found that an afterburner was not needed to burn off excess gases during operation of the reaction chamber, since essentially no flammable gases could be detected. It was determined that the medical waste and other organic matter that was disposed was completely oxidized, leaving no detectable solid residue except for a quantity of ash. The quantity of the ash that remained after disposal was found to be about 2% by weight of the organic matter that was initially disposed. The most preferred operating temperature was determined to be within a range from about 300° C. to about 375° C.

The foregoing process is repeated after introducing a metallic substrate into the fluidized bed of silica. Silicon nitride and/or silicon oxynitride are formed on the surface of the metallic substrate.

EXAMPLE 3

A reaction chamber similar to the one depicted in FIG. 3 and which included silica sand as the catalytically reactive media was adapted for use with a diesel engine. The diesel engine that was utilized for this experiment included a pair of exhaust pipes at the rear of the vehicle. A pair of rubber hoses were attached to the respective pair of exhaust pipes and joined together in a Y union to form a single exhaust conduit leading to the underside of the reaction chamber. A heating/compressor unit was also used in conjunction with the reaction chamber in order to introduce heated air under pressure into the reaction chamber as needed in order to provide a fluidized bed of silica sand heated to a temperature in a range from about 200° C. to about 375° C. In addition, a series of tubes configured and arranged so as to sample untreated exhaust gases as well as treated exhaust gases were interfaced with various analytical devices in order to test the level of waste products in the exhaust gases both before and after treatment by the reaction chamber.

In order to establish a benchmark for how much catalytic oxidation was being carried out by the reaction chamber, untreated exhaust gases were fed through a draw tube and caused to pass through a filter paper for a period of ten minutes in order to trap waste exhaust particulates, i.e. soot. After 10 minutes the filter paper was removed and inspected. A very noticeable buildup of black carbon soot was found on the filter paper.

Thereafter, exhaust gases that were treated by means of the reaction chamber were fed into a draw tube and caused to pass through a filter paper for a period of 10 minutes. Subsequent inspection of the filter paper revealed a remarkable drop in the level of soot that was collected, perhaps up to 95% or more. Whereas the untreated exhaust gases caused a build up of black soot on the filter paper that was easily transferred to a person's fingers, the treated exhaust yielded a faintly gray build up of material that did not easily rub off. Whereas these respective buildups of soot were not quantified a visual inspection showed a drop of at least 75–95% of soot compared to the untreated exhaust.

In addition, the level of carbon monoxide was measured both before and after treatment with the reaction chamber and found to be reduced by about 90%. This indicated that the catalytically reactive media particles were able to catalytically oxidize carbon monoxide to carbon dioxide in a short period of time as the waste exhaust gases rose through the catalytically reactive silica particles.

In addition, the level of nitrogen oxides ($NO_x$) was measured both before and after treatment with the reaction chamber and were also found to be reduced by about 90%. This indicated that the catalytically reactive media particles were able to catalytically eliminate nitrogen oxides in a short period of time as the waste exhaust gases rose through the catalytically reactive silica particles. They were most likely reformed into silicon nitride. Alternatively, they may have been reduced to nitrogen gas as the carbon, carbon monoxide and hydrocarbons were oxidized to carbon dioxide.

This experiment was repeated numerous times and each time there was a noticeable drop in the level of carbon soot, carbon monoxide and nitrogen oxides as a result of passing the waste exhaust gases through the reaction chamber. This demonstrated that the silica particles are catalytically reactive since merely passing a stream of exhaust gases through an inert bed would not be expected to cause further oxidation of any incomplete combustion products found therein. The dramatic increase in the rate and extent of oxidation of the incomplete combustion products strongly indicates the catalytic capabilities of silica sand relative to waste exhaust gases.

In the course of carrying out the foregoing experiments, a smooth, continuous transparent film of a reddish-brown material was found on the surface of an exhaust conduit used to vent gases from the reaction chamber. Thereafter, an iron bolt was inserted directly into the fluidized bed of silica and the same brownish-red, transparent material was deposited onto the bolt. Upon further analysis, the brownish-red material was identified as silicon nitride, or a mixture of silicon nitride and silicon oxynitride. Because the operating temperature of the reaction chamber was between 180° C. and 375° C. there could not have been carbothermal formation of silicon nitride following conventional processes since temperatures of about 1500° C. are required. Instead, it appears that some sort of catalytic reaction is occurring that drives the formation of silicon nitride as a byproduct during the catalytic oxidation of carbon in the presence of silica sand.

EXAMPLE 4

Further experiments were carried out using the apparatus described in Example 3, except that the silica sand was not fluidized as much but was kept in only a slightly elevated state. Furthermore, after the diesel engine was warmed up all auxiliary heat was cut off such that the only heat input into the reaction chamber was provided by the diesel engine exhaust. A series of measurements indicated that the temperature leveled off and remained at about 180° C. The treated exhaust gases were sampled and found to be virtually emission free. In particular, the filter paper used to sample particulates from the treated gases remained virtually clean over time (i.e. after sampling for more than 10 minutes), which indicated that over 99% of the particulates were being oxidized without any additional heat inputs.

Thereafter, large filter paper was placed over the opening of the exhaust stack itself for at least 10 minutes to ensure that the sampling techniques used above were not flawed in some way. The large filter paper was examined and appeared to be virtually clean, which indicated that virtually no particulates were passing through the reaction chamber and into the atmosphere. In short, simply passing waste exhaust gases through a slightly fluidized bed of ordinary silica sand resulted in the virtual elimination of all waste particulates found in diesel engine exhaust. This test confirms that ordinary silica sand can behave as a powerful catalyst in catalytically oxidizing incomplete combustion products of diesel fuel at temperatures as low as about 180° C. without the use of expensive conventional catalysts.

Silicon nitride was also formed on the surface of the exhaust stack as well as metallic substrates placed directly into the reaction chamber.

EXAMPLE 5

A reaction chamber containing silica is used to remove up to 98% of the soot and other unburnt carbonaceous materials emitted in the flue gas from an industrial burner that utilizes coal or fuel oil. Carbon monoxide and nitrogen oxides are also greatly reduced. Because the industrial plant is stationary, and because silica is extremely inexpensive, an amount of silica appropriate for oxidizing the unburnt components from the industrial burners is used. The temperature is maintained within a range from about 150° C. to about 500° C. by appropriate means, and the moisture content of the gases within the reaction chamber is maintained by appropriate means, such as by, e.g., a humidifier.

Silicon nitride is formed as a byproduct of the catalytic oxidation of the soot and other unburnt carbonaceous materials produced by the industrial burner.

In conclusion, the present invention provides methods and systems for the synthesis of silicon nitride (and silicon oxynitride) that avoid the use of dangerous and expensive chemical precursors.

The invention further provides methods and systems for manufacturing silicon nitride (and silicon oxynitride) that can be carried out without dangerous and expensive chemicals while operating at temperatures far lower than presently required using conventional carbothermal methods.

In addition the invention provides methods and systems for low temperature synthesis of silicon nitride (and silicon oxynitride) that are able to employ catalytic means in order to carry out a modified carbothermal reaction sequence for silicon nitride and silicon oxynitride at lower temperatures.

The invention also provides methods and systems for manufacturing silicon nitride and silicon oxynitride that can utilize commonly found materials which are inexpensive or which may even be considered to be waste products.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for the catalytic formation of silicon nitride comprising the steps of:

at least partially suspending a plurality of silica particles within a reaction chamber maintained at a temperature less than about 500° C.;

providing a metallic substrate in communication with the reaction chamber; and introducing nitrogen gas and finely divided carbon particulates into the reaction chamber while maintaining the reaction chamber at a temperature less than about 500° C. in order for the silica particles to react with the carbon particulates in the presence of the nitrogen gas so as to yield silicon nitride, wherein at least a portion of the silicon nitride is deposited onto the metallic substrate.

2. A method for the catalytic formation of silicon nitride as defined in claim 1, wherein the reaction chamber is maintained at a temperature in a range from about 150° C. to about 500° C.

3. A method for the catalytic formation of silicon nitride as defined in claim 1, wherein the reaction chamber is maintained at a temperature in a range from about 200° C. to about 450° C.

4. A method for the catalytic formation of silicon nitride as defined in claim 1, wherein the reaction chamber is maintained at a temperature in a range from about 250° C. to about 375° C.

5. A method for the catalytic formation of silicon nitride as defined in claim 1, further including the step of introducing moisture into the reaction chamber.

6. A method for the catalytic formation of silicon nitride as defined in claim 1, further including the step of introducing nitrogen gas into the reaction chamber at a concentration greater than that found in air.

7. A method for the catalytic formation of silicon nitride as defined in claim 1, wherein the carbon particulates are in the form of incomplete combustion products of carbon-containing fuel.

8. A method for the catalytic formation of silicon nitride as defined in claim 1, wherein silicon oxynitride is produced in addition to the silicon nitride.

9. A method for the catalytic formation of silicon nitride as defined in claim 1, wherein the metallic substrate is located external to, but in gaseous communication with, the reaction chamber.

10. A method for the catalytic formation of silicon nitride comprising the steps of:

at least partially suspending a plurality of silica particles within a reaction chamber maintained at a temperature less than about 500° C.;

providing a metallic substrate in communication with the reaction chamber; and introducing nitrogen gas and particulate carbon into the reaction chamber while maintaining the reaction chamber at a temperature less than about 500° C. in order for the silica particles to react with the particulate carbon in the presence of the nitrogen gas so as to yield silicon nitride, wherein the particulate carbon is selected from the group consisting of ground coal, ground charcoal, ground coke, ground wood, sawdust, ground paper, ground plastics, incomplete combustion products of carbon-containing fuel, and mixtures of the foregoing, wherein at least a portion of the silicon nitride is deposited onto the substrate.

11. A method for the catalytic formation of silicon nitride as defined in claim 10, further including the step of introducing nitrogen gas into the reaction chamber at a concentration greater than that found in air.

12. A method for the catalytic formation of silicon nitride as defined in claim 10, further including the step of introducing moisture into the reaction chamber.

13. A method for the catalytic formation of silicon nitride as defined in claim 10, further including the step of introducing nitrogen gas into the reaction chamber at a concentration greater than that found in air.

14. A method for the catalytic formation of silicon nitride as defined in claim 10, wherein silicon oxynitride is produced in addition to the silicon nitride.

15. A method for the catalytic formation of silicon nitride as defined in claim 10, wherein the metallic substrate is located external to, and in gaseous communication with, the reaction chamber.

16. A method for the catalytic formation of silicon nitride comprising the steps of:

at least partially suspending a plurality of silica particles within a reaction chamber maintained at a temperature less than about 500° C;

placing a metallic substrate within the reaction chamber; and introducing nitrogen gas and carbon particulates selected from the group consisting of ground coal, ground charcoal, ground coke, ground wood, sawdust, ground paper, ground plastics, incomplete combustion products of carbon-containing fuel, and mixtures of the foregoing into the reaction chamber while maintaining the reaction chamber at a temperature less than about 500° C. in order for the silica particles to react with the carbon particulates in the presence of the nitrogen gas so as to yield silicon nitride, wherein at least a portion of the silicon nitride is deposited onto the metallic substrate.

17. A method for the catalytic formation of silicon nitride as defined in claim 16, further including the step of introducing moisture into the reaction chamber.

18. A method for the catalytic formation of silicon nitride as defined in claim 16, further including the step of introducing nitrogen gas into the reaction chamber at a concentration greater than that found in air.

19. A method for the catalytic formation of silicon nitride as defined in claim 16, wherein silicon oxynitride is produced in addition to the silicon nitride.

* * * * *

UNITED STATES PATENT AND TRADEMARK OFFICE
CERTIFICATE OF CORRECTION

PATENT NO.  : 6,264,908 B1
DATED       : July 24, 2001
INVENTOR(S) : Thomas C. Maganas and Alan L. Harrington It is certified that error appears in the above-identified patent and that said Letters Patent is hereby corrected as shown below:

Column 2,
Line 15, before "advancement" change "her" to -- further --

Column 4,
Line 61, before "filed May 7," change "09/307/145" to -- 09/307,145 --

Column 5,
Line 43, after "conventional" change "carbothermial" to -- carbothermal --

Column 6,
Line 35, before "FIG. 1" delete [illustrated in]
Line 42, before "fossil fuels" change "bum" to -- burn --

Column 7,
Line 44, after "catalytically" change "reactive, particles" to -- reactive particles, --
Line 64, before "In many" insert a period after "art"

Column 9,
Line 43, before "power" change "a" to -- as --
Line 54, after "alternatively," change "beat" to -- heat --.

Signed and Sealed this

Seventh Day of May, 2002

Attest:

*Attesting Officer*

JAMES E. ROGAN
*Director of the United States Patent and Trademark Office*